(12) United States Patent
Swift et al.

(10) Patent No.: US 11,475,226 B2
(45) Date of Patent: Oct. 18, 2022

(54) REAL-TIME OPTIMIZED TRANSLATION

(71) Applicant: International Business Machines Corporation, Armonk, NY (US)

(72) Inventors: Mary D. Swift, Rochester, NY (US); Irene Lizeth Manotas, White Plains, NY (US); Jonathan D. Dunne, Dungarvan (IE)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 17/026,398

(22) Filed: Sep. 21, 2020

(65) Prior Publication Data
US 2022/0092272 A1    Mar. 24, 2022

(51) Int. Cl.
*G06F 40/51* (2020.01)
*H04L 51/046* (2022.01)
*G06F 40/58* (2020.01)

(52) U.S. Cl.
CPC .............. *G06F 40/51* (2020.01); *G06F 40/58* (2020.01); *H04L 51/046* (2013.01)

(58) Field of Classification Search
None
See application file for complete search history.

(56) References Cited

U.S. PATENT DOCUMENTS

| | | | |
|---|---|---|---|
| 6,393,389 B1 | 5/2002 | Chanod | |
| 7,403,890 B2 | 7/2008 | Roushar | |
| 7,676,372 B1 | 3/2010 | Oba | |
| 9,690,781 B1 | 6/2017 | Niles | |
| 2009/0083026 A1* | 3/2009 | Morsy | G06F 16/3337 704/9 |
| 2011/0046941 A1 | 2/2011 | Manuel-Devados | |
| 2016/0253318 A1 | 9/2016 | Lee | |
| 2016/0299965 A1* | 10/2016 | Starr | G06F 16/335 |
| 2019/0370340 A1* | 12/2019 | Leydon | H04L 51/10 |
| 2020/0007946 A1 | 1/2020 | Olkha | |
| 2020/0013387 A1 | 1/2020 | Sharifi | |
| 2022/0004716 A1* | 1/2022 | Wang | G06N 20/00 |

OTHER PUBLICATIONS

"Goodbye Language Barriers", Waverly Labs, ©2020 Waverly Labs, 12 pages, <https://www.waverlylabs.com/>.
"Google Translate", Downloaded Sep. 15, 2020, 1 page, <https://translate.google.com/>.

(Continued)

*Primary Examiner* — Antim G Shah
(74) *Attorney, Agent, or Firm* — Christopher M. Pignato; Brian M. Restauro

(57) ABSTRACT

In response to determining that a native language of a first user is different from a target language of a message to be transmitted by the first user to a second user, a translation model based on a plurality of language efficacies of the first user is created. An optimal action associated with a translation of the message from the native language to the target language is determined based on the created model and a language efficacy of the first user in the native language. The determined optimal action is performed. The message translation comprising the performed optimal action is transmitted to the second user.

20 Claims, 4 Drawing Sheets

(56) References Cited

OTHER PUBLICATIONS

"Microsoft Translator" © Microsoft 2020, 4 pages, <https://www.microsoft.com/en-us/translator/business/live/>.

"Microsoft Translator", © Microsoft 2019, 4 pages, <https://translator.microsoft.com/>.

"Microsoft Translator", © Microsoft 2020, 5 pages, <https://www.microsoft.com/en-us/translator/apps/>.

"System and Method for User Indicated Language Proficiency Levels to Drive Language Related Suggestions, Communication Support and Application Language", An IP.com Prior Art Database Technical Disclosure, Original Publication Date: Jul. 24, 2009, IP.com No. IPCOM000185403D, IP.com Electronic Publication Date: Jul. 24, 2009, 3 pages.

Statt, Nick, "Google Translate's real time transcription feature is out now for Android", The Verge, Mar. 17, 2020, 3 pages, <https://www.theverge.com/2020/3/17/21182640/google-translate-transcription-android-feature-real-time-ai>.

* cited by examiner

300

302

Muchos años después , frente al pelotón de fusilamiento , el coronel Aureliano Buendía había de recordar aquella tarde remota en que su padre lo llevó a conocer el hielo . Macondo era entonces una aldea de veinte casas de barro y cañabrava construidas a la orilla de un río de aguas diáfanas que se precipitaban por un lecho de piedras pulidas , blancas y enormes como huevos prehistóricos .

304

Después de muchos años, el coronel Aureliano Buendía recordó la tarde en que su padre lo llevó a conocer el hielo. En ese entonces, Macondo era una aldea de veinte casas de barro y cañabrava construidas a la orilla de un río con aguas cristalinas que se precipitaban por una cama de piedras blancas y enormes.

306

After many years, the colonel Aureliano Buendía remembered the afternoon in which his father took him to discover the ice. At that time, Macondo was a village of twenty mud and canabrava houses built at the bank of a river with crystalline waters that precipitated among a bed of white and big stones.

308

After many years, in front of the shutting platoon, the colonel Aureliano buendia remembered the afternoon in which his father took him to discover the ice. Macondo by then was a village of twenty mud and canabrava houses built at the bank of a river of crystalline waters that precipitated across a bed of polished, white and big stones, like prehistoric eggs.

310

After many years, Aureliano buendia remembered the afternoon in which his father took him to discover the ice. Macondo was a village of twenty mud and canabrava houses built at the bank of a river of crystalline waters that precipitated across a bed of white and big stones.

FIG. 3

REAL-TIME OPTIMIZED TRANSLATION

BACKGROUND

The present invention relates generally to the field of translation, and more particularly to improving real-time language translation based on language efficacy.

Some people only speak one language; i.e., their native language. Other people are able to speak more than one language; i.e., their native language and, for example, a second language. Most sources indicate that English is the most widely spoken language in the world followed closely by Mandarin Chinese. English is also recognized as the de facto international language of civil aviation, obviously for safety considerations as having an English only speaking air traffic controller communicating with a pilot that only speaks Finnish may lead to non-ideal landing of an aircraft. Speaking multiple languages is an obvious advantage for the multi-lingual person, allowing said person to be able to communicate better with other and to assist people who do not speak the same language with translation. Translation is defined as the communication of the meaning of a source language text by means of an equivalent target language text.

SUMMARY OF THE INVENTION

Embodiments of the present invention include an approach for improving real-time language translation based on language efficacy. In one embodiment, in response to determining that a native language of a first user is different from a target language of a message to be transmitted by the first user to a second user, a translation model based on a plurality of language efficacies of the first user is created. An optimal action associated with a translation of the message from the native language to the target language is determined based on the created model and a language efficacy of the first user in the native language. The determined optimal action is performed. The message translation comprising the performed optimal action is transmitted to the second user.

BRIEF DESCRIPTION OF THE DRAWINGS

FIG. 3 depicts example translations, in accordance with an embodiment of the present invention.

DETAILED DESCRIPTION

Figure 1:
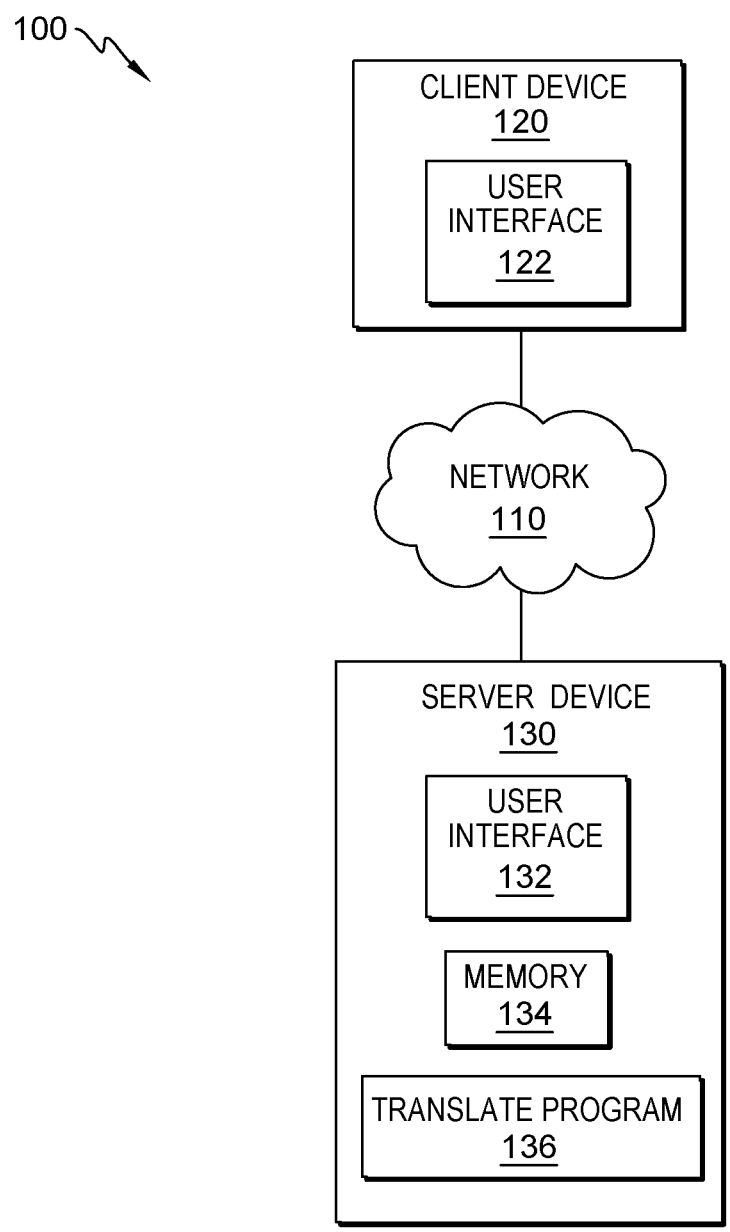
FIG. 1 depicts a functional block diagram illustrating a computing environment which includes a translate program, in accordance with an embodiment of the present invention.

Embodiments of the present invention recognize that communication today spans the entire globe. No longer do people only speak to other people that speak the same language. Many companies are multi-national with offices in several different countries. In one example, when two people cannot communicate effectively due to speaking two different languages, work is not done efficiently and the opportunity for errors increases greatly. In another example, technical support for certain equipment such as computers and printers is sometimes located in a different country from where the equipment is sold. In the example, a person who purchases a computer may need assistance in setting up the computer; the person reaches out to technical support and is connected with an individual who speaks a different language, or a chatbot service that also communicates in a different language. A translation system is needed that supports language understanding between speakers of different languages, and between speakers of the same language who may have widely different levels of fluency in the language and comprehension of the language.

Embodiments of the present invention recognize that there may be a method, computer program product, and computer system for improving real-time language translation based on language efficacy. The method, computer program product, and computer system improves the field and technology of translation by providing a means to assess the language efficacy between people (or a chatbot and a person, or a chatbot and another chatbot) communicating and determine whether a source text should be (i) summarized only, (ii) summarized and translated, or (iii) translated and summarized based on the determined language efficacy. A benefit provided by this is a more effective, efficient way of communicating. Further, in the case of a person interacting with a chatbot, a problem that person may be having (which creates the need for the chatbot communication) can be more quickly resolved when the language barrier is more efficiently broken between the person and the chatbot. In an embodiment, the native language of a first user, and a target language of a second user (i.e., the language that will be used in a response to the second user, the target language can be different from the native language of the first user or it can be the same) is determined. In the embodiment, a determination of the language efficacy of the first user in the native language of the first user is made. Further yet in the embodiment, a determination of the language efficacy of the first user in the target language is made. Further yet in the embodiment, a determination is made whether the native language and the target language are the same. Further yet in the embodiment, a translation model is created when the two languages are different. Further yet in the embodiment, an optimal action is determined based on the determined language efficacies. Further yet in the embodiment, the optimal action is performed. Further yet in the embodiment, the reply message is transmitted to the second user using the performed optimal action. Further yet in the embodiment, the target language efficacy of the recipient (i.e., second user) is determined when the two languages are the same. Further yet in the embodiment, a determination is made whether the determined efficacy of the second user is less than a threshold. Further yet in the embodiment, responsive to determining that the efficacy is below the threshold, the response is summarized and transmitted to the second user. Further yet in the embodiment, responsive to determining that the efficacy is at or above the threshold, the response is transmitted (without summarizing) to the second user.

References in the specification to "one embodiment", "an embodiment", "an example embodiment", etc., indicate that the embodiment described may include a particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention will now be described in detail with reference to the Figures.

FIG. 1 is a functional block diagram illustrating a computing environment, generally designated 100, in accordance with one embodiment of the present invention. FIG. 1 provides only an illustration of one implementation of the present invention and does not imply any limitations with regard to the systems and environments in which different embodiments may be implemented. Many modifications to the depicted embodiment may be made by those skilled in the art without departing from the scope of the invention as recited by the claims.

In an embodiment, computing environment 100 includes client device 120 and server device 130 interconnected by network 110. In example embodiments, computing environment 100 includes other computing devices (not shown in FIG. 1) such as additional wearable technology, cell phones, smartphones, phablets, tablet computers, laptop computers, desktop computers, other computer servers, or any other computer system known in the art, interconnected with client device 120 and server device 130 over network 110.

In embodiments of the present invention, client device 120 and server device 130 are connected to network 110, which enables client device 120 and server device 130 to access other computing devices and/or data not directly stored on client device 120 and server device 130. Network 110 may be, for example, a short-range, low power wireless connection, a local area network (LAN), a telecommunications network, a wide area network (WAN) such as the Internet, or any combination of the four, and include wired, wireless, or fiber optic connections. Network 110 includes one or more wired and/or wireless networks that are capable of receiving and transmitting data, voice, and/or video signals, including multimedia signals that include voice, data, and video information. In general, network 110 is any combination of connections and protocols that will support communications between client device 120, server device 130, and any other computing devices (not shown in FIG. 1) connected to network 110, in accordance with embodiments of the present invention.

According to an embodiment of the present invention, client device 120 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. According to embodiments, client device 120 can be a standalone computing device, a management server, a web server, a mobile computing device, or any other electronic device or computing system capable of receiving, transmitting, and processing data. In other embodiments, client device 120 can represent computing systems utilizing multiple computers as a server system, such as in a cloud computing environment. In certain embodiments, client device 120 represents a computer system utilizing clustered computers and components (e.g., database server computers, application server computers, etc.) that act as a single pool of seamless resources when accessed by elements of computing environment 100. In general, client device 120 is representative of any electronic device or combination of electronic devices capable of executing computer readable program instructions. In an embodiment, computing environment 100 includes any number of client device 120. Client device 120 may include internal and external hardware components as depicted and described in further detail with respect to FIG. 4, in accordance with embodiments of the present invention. According to an embodiment of the present invention, client device 120 includes user interface (UI) 122.

In an embodiment, UI 122 provides an interface between a user of client device 120 and translate program 136. UI 122 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. UI 122 may also be mobile application software that provides an interface between client device 120 and translate program 136. Mobile application software, or an "app," is a computer program designed to run on smartphones, tablet computers and other mobile devices. UI 122 enables a user of client device 120 to interact with the Internet, translate program 136, any other programs and applications included on client device 120 and server device 130 (not shown in FIG. 1), and any other computing devices (not shown in FIG. 1).

According to an embodiment of the present invention, server device 130 may be one of a laptop, tablet, or netbook personal computer (PC), a desktop computer, a personal digital assistant (PDA), a smartphone, a standard cell phone, a smartwatch or any other wearable technology, or any other hand-held, programmable electronic device capable of communicating with any other computing device within computing environment 100. Wearable technology, such as server device 130, are miniature electronic devices that may be worn by the bearer under, with, or on top of clothing, as well as in or connected to glasses, hats, or other accessories. Wearable technologies are especially useful for applications that require more complex computational support than merely hardware coded logics. In one embodiment, the server device 130 may be in the form of a head mounted display. The head mounted display may take the form-factor of a pair of glasses. In an embodiment, the wearable computer may be in the form of a smartwatch or a smart tattoo. According to embodiments, server device 130 can be a standalone computing device, a management server, a web server, a mobile computing device, or any other electronic device or computing system capable of receiving, transmitting, and processing data. In other embodiments, server device 130 can represent computing systems utilizing multiple computers as a server system, such as in a cloud computing environment. In certain embodiments, server device 130 represents a computer system utilizing clustered computers and components (e.g., database server computers, application server computers, etc.) that act as a single pool of seamless resources when accessed by elements of computing environment 100. In general, server device 130 is representative of any electronic device or combination of electronic devices capable of executing computer readable program instructions. In an embodiment, computing environment 100 includes any number of server device 130. Server device 130 may include internal and external hardware components as depicted and described in further detail with respect to FIG. 4, in accordance with embodiments of the present invention. According to an embodiment of the present invention, server device 130 includes user interface (UI) 132, memory 134, and translate program 136.

In an embodiment, UI 132 provides an interface between a user of server device 130 and translate program 136. UI 132 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. UI 132 may also be mobile application software that provides an interface between server device 130 and translate program 136. Mobile application software, or an "app," is a computer program designed to run on smartphones, tablet computers and other mobile devices. UI 132 enables a user of server device 130 to interact with client device 120, translate program 136, any other programs and applications included on server device 130 (not shown in FIG. 1), and any other computing devices (not shown in FIG. 1).

According to an embodiment, memory 134 is storage that is written to and/or read by translate program 136, and any other programs and applications on client device 120 and server device 130. In one embodiment, memory 134 resides on server device 130. In other embodiments, memory 134 resides on client device 120 or on any other device (not shown in FIG. 1) in computing environment 100, in cloud storage, or on another computing device accessible via network 110. In yet another embodiment, memory 134 represents multiple storage devices within server device 130. Memory 134 may be implemented using any volatile or non-volatile storage media for storing information, as known in the art. For example, memory 134 may be implemented with a tape library, optical library, one or more independent hard disk drives, multiple hard disk drives in a redundant array of independent disks (RAID), solid-state drives (SSD), or random-access memory (RAM). Similarly, memory 134 may be implemented with any suitable storage architecture known in the art, such as a relational database, an object-oriented database, or one or more tables. In an embodiment of the present invention, translate program 136, and any other programs and applications (not shown in FIG. 1) operating on client device 120 and server device 130 may store, read, modify, or write data to memory 134. In an embodiment of the present invention, data stored to memory 134 includes, but is not limited to, data stored by translate program 136 such as determined language efficacies, source text, summarized text, and translated text.

In an embodiment of the present invention, translate program 136 is a program, a subprogram of a larger program, an application, a plurality of applications, or mobile application software, which functions to improve real-time language translation based on language efficacy. A program is a sequence of instructions written to perform a specific task. In an embodiment, translate program 136 runs independently. In other embodiments, translate program 136 depends on system software and/or other programs (not shown in FIG. 1) to execute. According to one embodiment, translate program 136 is a cognitive system based on artificial intelligence utilizing machine learning and deep learning that (i) determines a native language of a user and a target language of a message, (ii) determines the user's efficacy in both the native and the target language, (iii) responsive to a determination that that native and target languages are different, creates a translation model, (iv) determines an optimal action via the created model based on the determined efficacies, (v) performs the action, and (vi) transmits the reply message utilizing the performed action. In an embodiment, translate program 136 functions as a stand-alone program residing on server device 130. In another embodiment, translate program 136 works in conjunction with other programs, applications, etc., found in computing environment 100. In yet another embodiment, translate program 136 resides on other computing devices such as client device 120 in computing environment 100, which are interconnected to server device 130 via network 110.

According to an embodiment, translate program 136 determines a native language of a responder. In the embodiment, translate program 136 determines a target language of a response. Further in the embodiment, translate program 136 determines an efficacy of the responder in the native language. Further yet in the embodiment, translate program 136 determines an efficacy of the responder in the target language. Further yet in the embodiment, translate program 136 determines whether the native and the target languages are the same. Further yet in the embodiment, responsive to determining that the native and target languages are different, translate program 136 creates a model. Further yet in the embodiment, translate program 136 determines an optimal action. Further yet in the embodiment, translate program 136 performs the optimal action. Further yet in the embodiment, translate program 136 transmits the reply utilizing the optimal action. Further in the embodiment, responsive to determining that the native and target languages are not different, translate program 136 determines an efficacy of the recipient in the target language. Further yet in the embodiment, translate program 136 determines whether the efficacy of the recipient in the target language is less than a threshold. Further yet in the embodiment, responsive to determining that the efficacy of the recipient in the target language is less than the threshold, translate program 136 summarizes the response and transmits the summarized response. Further yet in the embodiment, responsive to determining that the efficacy of the recipient in the target language is not less than the threshold, translate program 136 transmits the response without summarizing said response.

Figure 2:
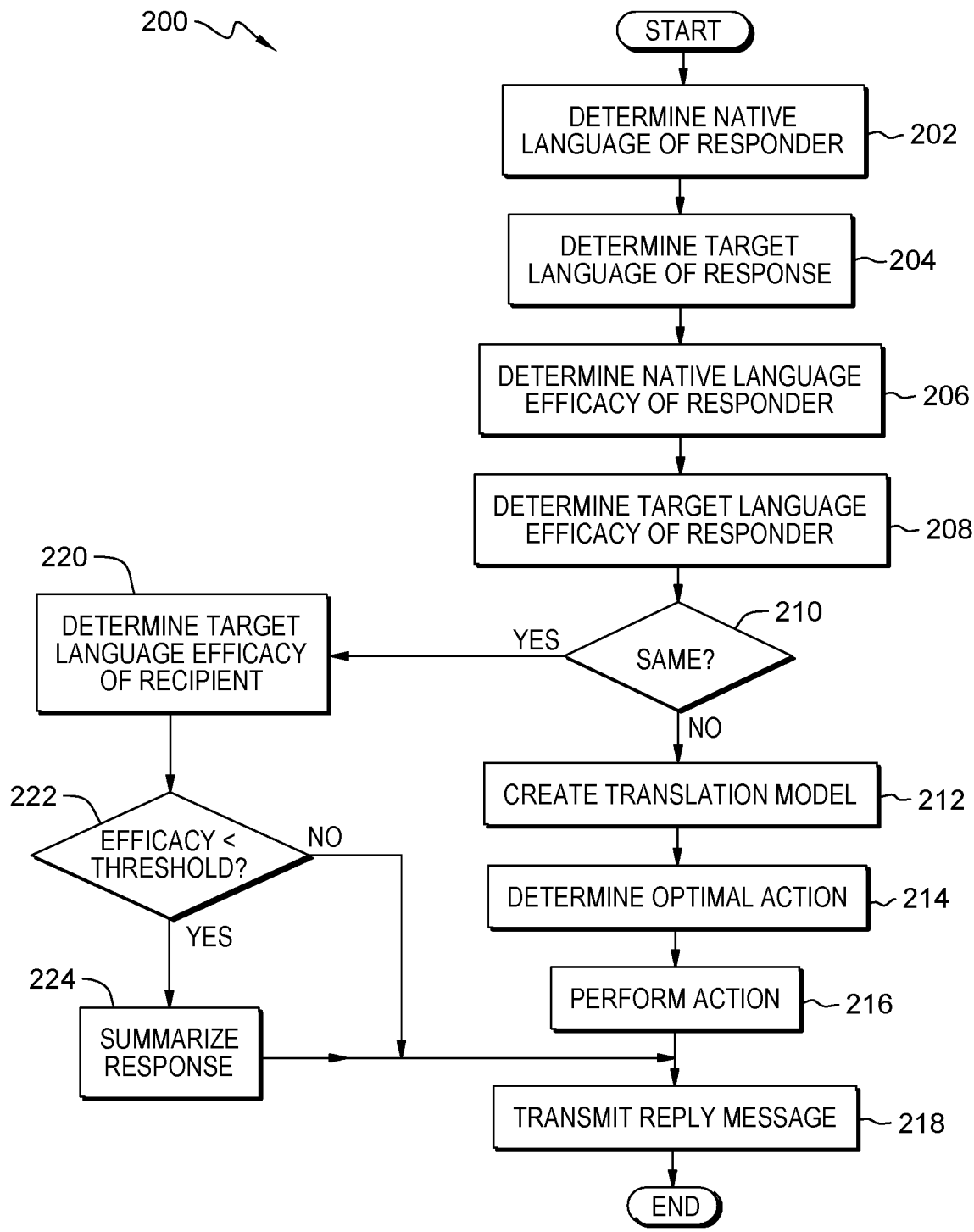
FIG. 2 is a flowchart depicting operational steps of a program for improving real-time language translation based on language efficacy, on a computing device within the computing environment of FIG. 1, in accordance with an embodiment of the present invention.

FIG. 2 is a flowchart of workflow 200 depicting operational steps of a program for improving real-time language translation based on language efficacy. In one embodiment, the method of workflow 200 is performed by translate program 136. In an alternative embodiment, the method of workflow 200 is performed by any other program in computing environment 100 working with translate program 136. In an embodiment, a user of client device 120 invokes workflow 200 upon interacting with a chatbot. In an alternative embodiment, a user of client device 120 invokes workflow 200 upon receiving an inquiry in a language different from the native language of the user.

In an embodiment, translate program 136 determines a native language of a responder (step 202). In other words, translate program 136 determines the everyday language used by a person or the language used by a chatbot for communicating with another person (e.g., responding to an inquiry). According to an embodiment, translate program 136, based on an opt-in of the person who can opt-out, determines the everyday language of the person by retrieving a preferred language from a personnel page. According to another embodiment, translate program 136 retrieves communications of the person from sources such as emails and social media to determine the everyday language of the person. In an embodiment, translate program 136 on server device 130 determines the native language of a person or chatbot communicating with another person. For example, a program on Ned's computer determines that a customer service chatbot is programmed to respond in English, but also has the capability to respond in several other languages.

According to an embodiment, translate program 136 determines a target language of a response (step 204). In other words, translate program 136 determines the language to be used by the responder for a response. In an embodiment, translate program 136 determines the target language based on the language of an inquiry or other communication received by the responder. According to an embodiment of the present invention, translate program 136 on server device 130 determines the target language to be used in a response transmitted via network 110 to a user of client device 120 (i.e., the language a response recipient uses every day or has used in an inquiry). For example, the program on Ned's computer determines that the language of an inquiry, received from Francois, is French and thus, the response to the inquiry will be in French.

In an embodiment, translate program 136 determines a native language efficacy of the responder (step 206). In other words, translate program 136 determines the efficacy (i.e., effectiveness) of the responder in the native language. According to an embodiment, translate program 136 determines the language efficacy by retrieving the responder's previous communications in the native language (e.g., chat history, social media, text, emails, etc.) and determines the language efficacy of the responder by analyzing the previous communications using readability assessment techniques that are well known in the art such as gunning-fog, Flesch-Kincaid, Dale-Chall, and Coleman-Liau index. These readability assessment techniques determine a readability score for the user in a language, and thus, the fluency of the user for the language. In an embodiment, translate program 136 on server device 130 determines a fluency of the responder in the native language of the responder. For example, the program on Ned's computer determines the fluency of the chatbot in the English language.

According to an embodiment, translate program 136 determines a target language efficacy of the responder (step 208). In other words, translate program 136 determines the efficacy (i.e., effectiveness) of the responder in the target language. In an embodiment, translate program 136 determines the language efficacy by retrieving the responder's previous communications in the target language (e.g., chat history, social media, text, emails, etc.) and determines the language efficacy of the responder by analyzing the previous communications using readability assessment techniques that are well known in the art such as gunning-fog, Flesch-Kincaid, Dale-Chall, and Coleman-Liau index. These readability assessment techniques determine a readability score for the user in a language, and thus, the fluency of the user for the language. According to an embodiment, translate program 136 on server device 130 determines a fluency of the responder in the target language of the responder. For example, the program on Ned's computer determines the fluency of the chatbot in the French language.

In an embodiment, translate program 136 determines whether the native language and the target language are the same (decision step 210). In other words, based on the determined native and target languages, translate program 136 determines whether the two languages are the same. In one embodiment (decision step 210, YES branch), translate program 136 determines that the native language and the target language are the same; therefore, translate program 136 proceeds to step 220 to determine the language efficacy or the recipient in the target language. In the embodiment (decision step 210, NO branch), translate program 136 determines that the native language and the target language are not the same; therefore, translate program 136 proceeds to step 212.

According to an embodiment, translate program 136 creates a translation model (step 212). In other words, responsive to determining that the native language and the target language are not the same, translate program 136 creates a Summary with Translation Interpretability (SwTI) model. In an embodiment, translate program 136 creates the SwTI model considering the native language efficacy of the responder and the model is based on pre-trained language models such as BERT or GPT-2, models which use a series of transformation layers to achieve a high degree of precision of translation that are well known in the art. According to an embodiment, translate program 136 on server device 130 creates the SwTI model based on the responder's efficacy in the native language and utilizes any number of pre-trained language models. For example, the program on Ned's computer creates a model based on the fluency of the chatbot in English and uses any number of pre-trained language models.

In an embodiment, translate program 136 determines an optimal action (step 214). In other words, translate program 136 utilizes the SwTI model to determine an optimal action for the responder to utilize in the response. According to an embodiment, one optimal action is to translate the response from the native language to the target language, and then summarize the translated response (e.g., when the efficacy of the responder is below a threshold efficacy). According to another embodiment, another optimal action is to summarize the response in the native language, and then translate the summary from the native language to the target language (e.g., when the efficacy of the responder is above a threshold efficacy). When the efficacy of the responder in the native language is below a threshold, the SwTI model determines that the optimal action is to translate the complete response into the target language and then to summarize said translated response to the target language of the recipient; by first translating the complete response, no intended meaning included in the response is lost by initially summarizing said response. However, when the efficacy of the responder in the native language is above the threshold, the SwTI model determines that the optimal action is to first summarize the response in the native language, thus making the response as clear as possible, and then to translate the summary to the target language of the recipient. As previously discussed, the SwTI model uses any of the known readability assessment techniques to determine the efficacy of the responder in the native language of the responder. In an embodiment, based on the results of the SwTI model, translate program 136 on server device 130 determines an optimal action to be used by the responder in the response. For example, the program on Ned's computer determines an optimal action, based on the created model, for the chatbot's response to the inquiry received from Francois.

According to an embodiment, translate program 136 performs action (step 216). In other words, translate program 136 performs the determined optimal action based on the response from the created SwTI model. In an embodiment, the optimal action is one of (i) translating the response to the target language and summarizing said translated response or (ii) summarizing the response in the native language and translating said summarized response to the target language. According to an embodiment, translate program 136 on server device 130 performs the determined optimal action based on the model's response. For example, the program on Ned's computer performs the action of first summarizing the response of the chatbot in English, and then translating that summarized response in the French language.

In an embodiment, translate program 136 transmits reply message (step 218). In other words, responsive to the optimal action being performed, translate program 136 transmits the reply message to the recipient which includes the performed action in the response. According to an embodiment, the transmitted reply is transmitted using any technology known in the art such as instant messaging, email, text, video chat, and the like. In an embodiment, translate program 136 on server device 130 transmits the reply message via network 110 to the user of client device 120. For example, the program on Ned's computer transmits reply from the chatbot, which is the response summarized in English and subsequently translated into French, to Francois.

According to an embodiment, determines target language efficacy of recipient (step 220). In other words, responsive to determining that the native language and the target language are the same, translate program 136 determines the efficacy, in the target language, of the recipient. In an embodiment, translate program 136 determines the language efficacy by retrieving the recipient's previous communications in the target language (e.g., chat history, social media, text, emails, etc.) and determines the language efficacy of the recipient by analyzing the previous communications using readability assessment techniques that are well known in the art such as gunning-fog, Flesch-Kincaid, Dale-Chall, and Coleman-Liau index. These readability assessment techniques determine a readability score for the user in a language, and thus, the fluency of the user for the language. According to an embodiment, translate program 136 on server device 130 determines a fluency of the user of client device 120 in the target language of the response. For example, the program on Ned's computer determines the fluency of Francois in the English language; in this example, both the chatbot and Francois utilize the English language.

In an embodiment, translate program 136 determines whether the efficacy is less than a threshold (decision step 222). In other words, translate program 136 determines whether the efficacy of the recipient in the target language (in this case, the same as the native language) is below a threshold efficacy. According to an embodiment, the threshold efficacy is determined by a user. According to another embodiment, the threshold efficacy is determined by translate program 136. In one embodiment (decision step 222, NO branch), translate program 136 determines that the efficacy of the recipient in the target (i.e., native) language is not below a threshold; therefore, translate program 136 proceeds to step 218 to transmit the reply message in the target language without summarizing said reply message. In the embodiment (decision step 222, YES branch), translate program 136 determines that the efficacy of the recipient in the target (i.e., native) language is below the threshold; therefore, translate program 136 proceeds to step 224.

According to an embodiment, translate program 136 summarizes response (step 224). In other words, responsive to determining that the efficacy of the recipient in the target language (in this case, also the native language as the two languages are the same) is below a threshold, translate program 136 summarizes the response and then proceeds to step 218 to transmit the summarized reply message to the recipient. In an embodiment, translate program 136 summarizes the response using a combination model with hyperparameters and transformation layers (e.g., BERT and GPT-2) as known in the art. According to an embodiment, translate program 136 on server device 130 summarizes the response in the target (which is also the native) language and transmits the summarized response via network 110 to the user of client device 120. For example, the program on Ned's computer summarizes the chatbot's response to Francois in the target (i.e., native) language and then transmits said summarized response to Francois.

FIG. 3 depicts translation 300 which includes original text 302, summarized text 304, translated text 306, translated text 308, and summarized text 310. The combination of original text 302, summarized text 304, and translated text 306 is an example of the optimal action "summarize, then translate". The combination of original text 302, translated text 308, and summarized text 310 is an example of the optimal action "translate, then summarize".

Summarized text 304 is a summary of original text 302 in the same (or native) language. At this point, no translation of original text 302 from the native language has occurred.

Translated text 306 is a translation, from the native language to the target language, of summarized text 304. The translation from the native language to the target language of summarized text 304 (thus creating translated text 306) completes the optimal action "summarize, then translate".

Translated text 308 is the translation of original text 302 from the native language to the target language. At this point, no summarization of either original text 302 or translated text 308 has occurred.

Summarized text 310 is a summary, in the target language, of translated text 308. The summary of the translation while still in the same, target language (i.e., summarizing translated text 308) completes the optimal action "translate, then summarize".

Figure 4:
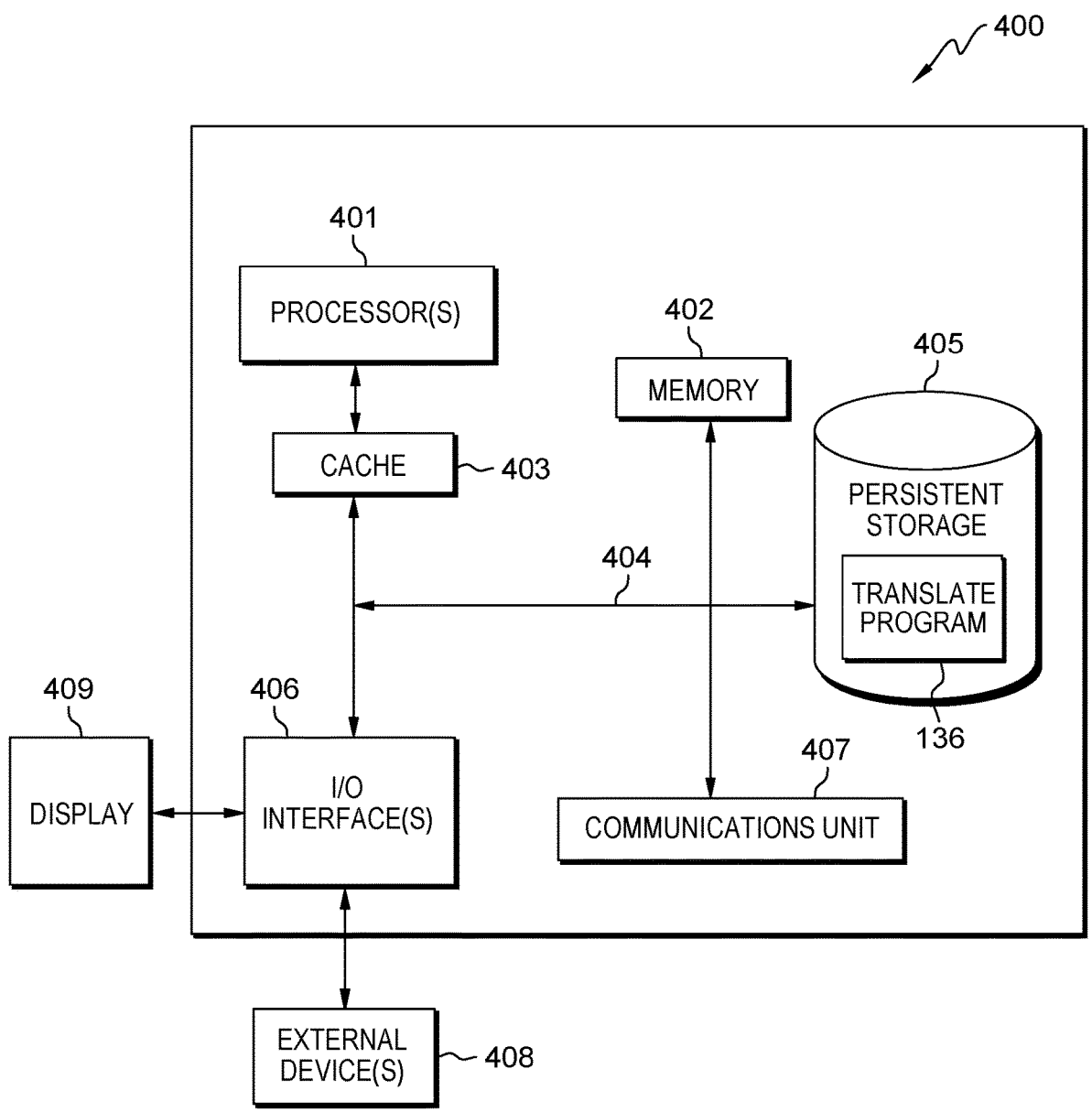
FIG. 4 depicts a block diagram of components of a computing device executing a translate program within the computing environment of FIG. 1, in accordance with an embodiment of the present invention.

FIG. 4 depicts computer system 400, which is an example of a system that includes translate program 136. Computer system 400 includes processors 401, cache 403, memory 402, persistent storage 405, communications unit 407, input/output (I/O) interface(s) 406 and communications fabric 404. Communications fabric 404 provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 via I/O interface(s) 406. PO interface(s) 406 also connect to display 409.

Display 409 provides a mechanism to display data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method, the method comprising:
   responsive to determining that a native language of a first user is different from a target language of a message to be transmitted by the first user to a second user, creating, by one or more computer processors, a translation model based on a plurality of language efficacies of the first user;
   determining, by one or more computer processors, an optimal action associated with a translation of the message from the native language to the target language based on the created translation model and a language efficacy of the first user in the native language;
   performing, by one or more computer processors, the determined optimal action;
   responsive to determining that the native language of the first user and the target language of the message to be transmitted by the first user to the second user is the same, determining, by one or more computer processors, an efficacy of the second user in the target language;
   responsive to determining that the determined efficacy of the second user in the target language is less than a threshold efficacy, summarizing, by one or more computer processors, the message in the native language to be transmitted by the first user to the second user; and
   transmitting, by one or more computer processors, the message translation comprising the performed optimal action to the second user.

2. The method of claim 1, wherein the optimal action comprises one of (i) a translation of the message by the first user from the native language to the target language followed by a summarization of the translated message in the target language and (ii) a summarization of the message by the first user in the native language followed by a translation of the summarized message from the native language to the target language.

3. The method of claim 1, further comprising:
   determining, by one or more computer processors, a native language of a first user;
   determining, by one or more computer processors, a target language of a response by the first user;
   determining, by one or more computer processors, an efficacy of the first user in the native language; and
   determining, by one or more computer processors, an efficacy of the first user in the target language.

4. The method of claim 1, further comprising:
   transmitting, by one or more computer processors, the summarized message to the second user in the target language.

5. The method of claim 1, further comprising:
   responsive to determining that the determined efficacy of the second user in the target language is not less than the threshold efficacy, transmitting, by one or more computer processors, the message in the target language to the second user.

6. The method of claim 1, wherein the translation model is further based on one or more pre-trained language models which use a series of transformation layers to achieve a precise translation.

7. The method of claim 3, wherein the method to determine both the efficacy of the first user in the native language and the efficacy of the first user in the target language is selected from the group consisting of gunning-fog, Flesch-Kincaid, Dale-Chall, and Coleman-Liau.

8. A computer program product, the computer program product comprising:
   one or more computer readable storage media; and
   program instructions stored on the one or more computer readable storage media, the program instructions comprising:
      responsive to determining that a native language of a first user is different from a target language of a message to be transmitted by the first user to a second user, program instructions to create a translation model based on a plurality of language efficacies of the first user;
      program instructions to determine an optimal action associated with a translation of the message from the native language to the target language based on the created translation model and a language efficacy of the first user in the native language;
      program instructions to perform the determined optimal action;
      responsive to determining that the native language of the first user and the target language of the message to be transmitted by the first user to the second user is the same, program instructions to determine an efficacy of the second user in the target language;
      responsive to determining that the determined efficacy of the second user in the target language is less than a threshold efficacy, program instructions to summarize the message in the native language to be transmitted by the first user to the second user; and
      program instructions to transmit the message translation comprising the performed optimal action to the second user.

9. The computer program product of claim 8, wherein the optimal action comprises one of (i) a translation of the message by the first user from the native language to the target language followed by a summarization of the translated message in the target language and (ii) a summarization of the message by the first user in the native language followed by a translation of the summarized message from the native language to the target language.

10. The computer program product of claim 8, further comprising program instructions stored on the one or more computer readable storage media, to:
   determine a native language of a first user;
   determine a target language of a response by the first user;
   determine an efficacy of the first user in the native language; and
   determine an efficacy of the first user in the target language.

11. The computer program product of claim 8, further comprising program instructions stored on the one or more computer readable storage media, to:
   transmit the summarized message to the second user in the target language.

12. The computer program product of claim 8, further comprising program instructions stored on the one or more computer readable storage media, to:
   responsive to determining that the determined efficacy of the second user in the target language is not less than the threshold efficacy, transmit the message in the target language to the second user.

13. The computer program product of claim 8, wherein the translation model is further based on one or more pre-trained language models which use a series of transformation layers to achieve a precise translation.

14. The computer program product of claim 10, wherein the method to determine both the efficacy of the first user in the native language and the efficacy of the first user in the target language is selected from the group consisting of gunning-fog, Flesch-Kincaid, Dale-Chall, and Coleman-Liau.

15. A computer system, the computer system comprising:
   one or more computer processors;
   one or more computer readable storage media; and
   program instructions stored on the one or more computer readable storage media for execution by at least one of the one or more computer processors, the program instructions comprising:
      responsive to determining that a native language of a first user is different from a target language of a message to be transmitted by the first user to a second user, program instructions to create a translation model based on a plurality of language efficacies of the first user;
      program instructions to determine an optimal action associated with a translation of the message from the native language to the target language based on the created translation model and a language efficacy of the first user in the native language;
      program instructions to perform the determined optimal action;
      responsive to determining that the native language of the first user and the target language of the message to be transmitted by the first user to the second user is the same, program instructions to determine an efficacy of the second user in the target language;
      responsive to determining that the determined efficacy of the second user in the target language is less than a threshold efficacy, program instructions to summarize the message in the native language to be transmitted by the first user to the second user; and
      program instructions to transmit the message translation comprising the performed optimal action to the second user.

16. The computer system of claim 15, wherein the optimal action comprises one of (i) a translation of the message by the first user from the native language to the target language followed by a summarization of the translated message in the target language and (ii) a summarization of the message by the first user in the native language followed by a translation of the summarized message from the native language to the target language.

17. The computer system of claim 15, further comprising program instructions stored on the one or more computer readable storage media for execution by at least one of the one or more computer processors, to:
   determine a native language of a first user;
   determine a target language of a response by the first user;
   determine an efficacy of the first user in the native language; and
   determine an efficacy of the first user in the target language.

18. The computer system of claim 15, further comprising program instructions stored on the one or more computer readable storage media for execution by at least one of the one or more computer processors, to:
   transmit the summarized message to the second user in the target language.

19. The computer system of claim 15, further comprising program instructions stored on the one or more computer readable storage media for execution by at least one of the one or more computer processors, to:
   responsive to determining that the determined efficacy of the second user in the target language is not less than the threshold efficacy, transmit the message in the target language to the second user.

20. The computer system of claim 15, wherein the translation model is further based on one or more pre-trained language models which use a series of transformation layers to achieve a precise translation.

\* \* \* \* \*